United States Patent
Fischer et al.

(10) Patent No.: US 9,390,562 B2
(45) Date of Patent: Jul. 12, 2016

(54) MULTIPLE PERSPECTIVE VIDEO SYSTEM AND METHOD

(71) Applicant: NBCUniversal Media, LLC, New York, NY (US)

(72) Inventors: Ronald Fischer, Los Angeles, CA (US); Abraham Rank, Lake Balboa, CA (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 93 days.

(21) Appl. No.: 13/956,955

(22) Filed: Aug. 1, 2013

(65) Prior Publication Data
US 2015/0035862 A1 Feb. 5, 2015

(51) Int. Cl.
*G06T 19/00* (2011.01)

(52) U.S. Cl.
CPC .................. *G06T 19/006* (2013.01)

(58) Field of Classification Search
CPC .......... H04N 5/23293; H04N 5/23219; H04N 5/23296; H04N 13/0296; H04N 13/0429; H04N 13/044; H04N 1/00347

USPC .......................................... 348/376
See application file for complete search history.

(56) References Cited

U.S. PATENT DOCUMENTS

| 8,194,101 B1 * | 6/2012 | Mann et al. ............ 345/633 |
| 2012/0212398 A1 * | 8/2012 | Border et al. ............ 345/8 |

* cited by examiner

*Primary Examiner* — Twyler Haskins
*Assistant Examiner* — Padma Haliyur
(74) *Attorney, Agent, or Firm* — Fletcher Yoder, P.C.

(57) ABSTRACT

Subject viewpoint data and external viewpoint data are collected, such as via cameras, and separate virtual or synthetic video views are generated, one from the subject viewpoint and one from an external viewpoint. The subject video view is presented to the subject, such as via a headset, while the external video view is presented to at least one other person. At least the subject video view is presented sufficiently close in time to permit the subject to react to it. A model is referenced so the video views may include a virtual or synthetic setting, or at least partial replacement of the subject with a character, or both.

24 Claims, 7 Drawing Sheets

MULTIPLE PERSPECTIVE VIDEO SYSTEM AND METHOD

BACKGROUND

The invention relates generally to the field of computer-assisted techniques for developing and using virtual environments, such as for use in entertainment, training, simulation and other applications.

The use of computer simulated, and assisted, environments has flourished in recent decades, particularly with the development of so-called "virtual reality" and "augmented reality" systems. Such systems typically either completely or partially create artificial surroundings that are experienced by users, typically with inputs such as the position and motion of the user, or part of the user, such as the head and hands. In some systems the user may view a screen or wear a device such as goggles, headphones, helmets, and so forth in which the virtual setting is displayed, thereby adding to the apparent authenticity of the experience. In such systems, the user may or may not be included in the images created.

Another development in a parallel field is sometimes termed "virtual sets" or "virtual set backgrounds". In these systems, a person, such as a presenter, may be placed before a monochromatic background, and a computer-generated setting is added to provide the appearance that the person is actually in and surrounded by the virtual set. Such systems may be used, for example, in television and entertainment applications, among others. In certain of these techniques, various pre-recorded or virtual features may be added to create a complex, somewhat hybrid view in which one or more persons appears in sets, with objects and environments added by computer assistance.

There remains a need for further developments in the field, however. For example, to date systems generally do not marry the functionality of virtual or augmented reality, as experienced by a user, with those of virtual sets, as experienced by an audience. Moreover, useful integrations of such technologies will not simply consist of the using both in parallel, but will require innovative association and cooperation of image capture components, modeling components, image reconstruction components, and so forth.

BRIEF DESCRIPTION

The present invention provides systems and methods designed to respond to such needs. In accordance with certain embodiment, a system comprises a subject data system comprising a camera configured to be worn by a subject to capture subject video image data and a viewer to display a subject video view from a subject point of view. An external camera is configured to capture external video image data of the subject from an external point of view. A processing system is configured to receive the subject video image data and the external video image data and to generate the subject video view for the subject point of view in a virtual setting and a second video view from the external point of view in the virtual setting based on the subject and external video image data. The subject video view is presented to the subject via the viewer sufficiently close in time to the capture the subject video image data to permit the subject to react to the subject video view.

In accordance with another aspect, a system comprises a subject data system comprising a sensing device configured to determine subject viewpoint data indicative of a subject point of view and a viewer to display a subject video view from a subject point of view. An external data system is configured to determine external viewpoint data indicative of position and movement of the subject from an external point of view. A processing system is configured to receive the subject and external viewpoint data, to reference a virtual model, and to generate the subject video view for the subject point of view in a synthetic setting and a second video view from the external point of view in the synthetic setting based on the subject and external viewpoint data. The subject video view is presented to the subject via the viewer sufficiently close in time to the determination of the subject viewpoint data to permit the subject to react to the subject video view.

The invention also provides a method comprising determining subject viewpoint data indicative of a subject point of view, and determining external viewpoint data indicative of position and movement of the subject from an external point of view. The subject and external viewpoint data and a virtual model are processed to generate a subject video view for the subject point of view in a synthetic setting and/or with at least partial replacement of the subject with a virtual character representation, and a second video view from the external point of view in the synthetic setting and/or with the at least partial replacement of the subject with the virtual character representation. The subject video view is presented to the subject via the viewer sufficiently close in time to the determination of the subject viewpoint data to permit the subject to react to the subject video view.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As a preliminary matter, the following disclosure discusses images and video views from different points of view, and with different content. For example, a first or subject view will typically include a series of images updated regularly to simulate motion and containing position and orientation information from the perspective of a subject (e.g., a person participating in the experience). The images and video provided to the subject will generally be delivered during the experience, such that the subject may interact with, at least virtually, the presented environment, and may be two-dimensional or three dimensional (e.g., stereo) in nature. The environment itself may include elements of the real world (e.g., from pre-recorded image data), wholly imaginary elements, augmented reality views and elements, current "real world" views with added elements, or any or all of these. Such views may sometimes be referred to herein as "synthetic" insomuch as they are generated by the system for viewing by the subject (but can also be presented to others, including an "audience" or others for viewing). A second view will be created from an external perspective that will typically include the subject, or a surrogate, such as a character that may include part of the subject or that may be wholly different from the subject yet move and interact as the subject does in the simulated environment. This view may be similarly referred to as "synthetic" insomuch as it too will utilize aspects of the virtual environment. Thus, terms such as "synthetic", "simulated", "virtual", and the like may be generally similar in their reference, and will pertain to views that are at least partially computer-generated or assembled based upon data collected during the experience that is indicative of a subject viewpoint and a viewpoint external to the subject.

Figure 1:
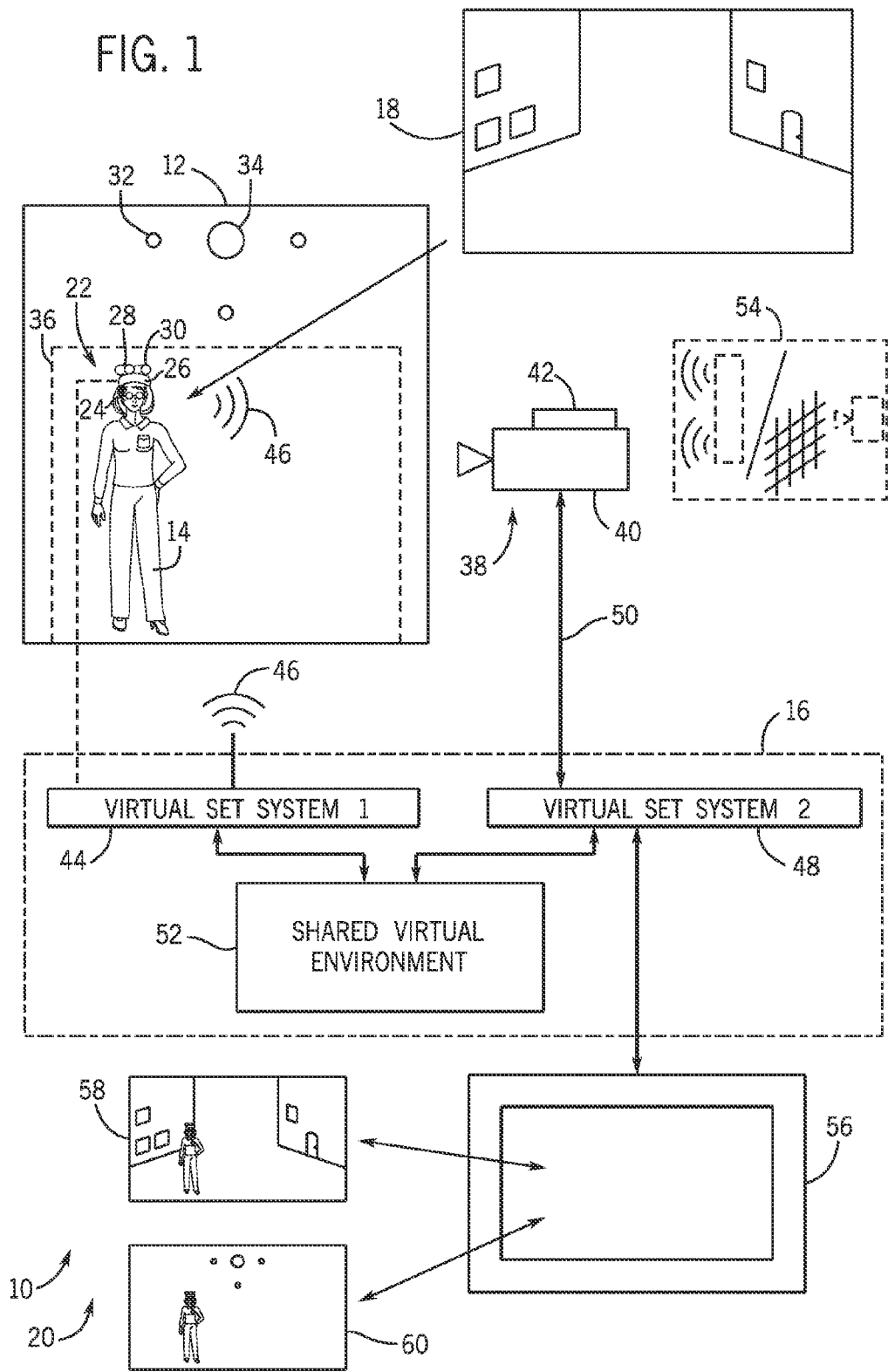
FIG. 1 is a diagrammatical representation of a virtual set system including the ability to generate user or subject-experienced views as well as external or audience-experienced views.

Turning to the drawings, FIG. 1 illustrates a virtual set system, designated generally by the reference numeral 10 in accordance with aspects of a present implementation. The virtual set system will typically make use of an actual set or setting 12 in which a subject 14 is positioned. The subject may be a human being, although a wide range of subjects may be used, including multiple persons, animals, robots, machines and machine elements, and other objects. Moreover, in many applications, the set or setting 12 may be in a studio, workspace, or another controlled location, and may use conventional blue or green backdrops to allow for and facilitate the placement of the subject in a virtual setting as described below.

The system further includes a processing system 16 which itself may comprise a number of functional components typically implemented by one or more computer systems. The processing system will accept data from several sources and provide several views which can be displayed for the subject, for audiences, for recording and broadcast or distribution, and so forth. In the illustration of FIG. 1, these include a subject video view illustrated by inset 18 that will be displayed for the subject and one or more second video views 20 that can be displayed for others, such as audiences, producers, and so forth.

The subject is provided with one or more input and output devices, referred to collectively by reference numeral 22, that will allow for position and orientation data, such as image data, movements data, and so forth to be gathered as the subject is present in and moves within the actual setting, and that also permit subject-perspective views to be provided to the subject. These may include various means of actively manipulating the virtual set environment. In a currently contemplated implementation, this relies on a viewing device, such as glasses, goggles or a head-work viewer 24. In the illustrated embodiment, for example, the subject wears headgear, such as a helmet 26 that includes data capture components and processing components to capture position and orientation data and at least partially process the data for use by the system. The viewer and data capture elements may be integrated into a single system in some embodiments. In addition to or in lieu of such components, the subject could carry or wear sensors, such as a full or partial motion capture suit, gloves, and so forth. In the illustrated embodiment, the helmet itself includes a first camera 28 which may be referred to as an orientation camera, as well as a second camera 30 which may be referred to as a stabilization camera. Both cameras collect image data during use, and provide a subject perspective of the actual setting, capturing both the position and motion of the subject within the setting. In the illustrated context, to facilitate the orientation and stabilization functions, several fiducials 32 may be used for the orientation function, while the same or other fiducials 34 may be used for the stabilization. These fiducials are typically placed in the actual set, while the subject will ultimately be viewed, after image processing, in a virtual set designated generally by reference numeral 36. In some cases the virtual set may incorporate elements of the actual set, while in other situations the virtual set may be entirely synthesized from pre-recorded images, modeled images, and so forth. In future implementations, "fiducials" may be or rely on a mixture of high contrast features (either in brightness, color, depth or some other detectable parameter), which may be used with dedicated fiducial features.

Also illustrated in FIG. 1 are external perspective data capture systems or components that allow for the capture of external perspective data, such as images or movement data for the subject in the actual set. In the illustrated embodiment these include, for example, a camera 40 and an associated position/orientation component designated by reference numeral 42. As will be apparent by those skilled in the art, such cameras may include video cameras, both digital and film-based, or any suitable imaging equipment (e.g., 2D, 3D, etc.). The position/orientation components may be integrated into the camera or associated with the camera so as to detect the camera location, position, orientation, and so forth with respect to the subject and/or the actual set.

In many cases, the subject perspective data (e.g., imaging) components and the external perspective data (e.g., image) components will operate at the same time to simultaneously capture both data from the perspective subject as well as data from an external perspective that includes the subject. As noted, in certain contexts this data may not strictly be image data, but will be sufficient to position and orient the subject in the actual setting so that the subject or a surrogate character or other instantiation of the subject may be positioned in the virtual setting. The data captured is provided to the processing system 16. The data may be stored and later processed, or certain processing may be performed during the data capture. The latter implementations may be thought of as "real time" although the actual processing will often be somewhat delayed from the image data capture (sometimes referred to as "near real time"). Thus, either in "real time" or in "post-processing", the processing system allows for creation of actual views, virtual views, composite views, and so forth. In the illustrated implementation, the processing system includes a first virtual set system, designated by reference numeral 44, which will be in contact with the data capture components associated with the subject. Although these may be wired connections as illustrated by the dashed line in FIG. 1, in many implementations the connection may be made wirelessly, as indicated by reference numerals 46. A second virtual set system, designated by reference numeral 48 is in communication with the external data capture components, and will typically be wired as indicated by reference numeral 50, although wireless connections are also feasible. Both virtual set systems 44 and 48 are in communication with a shared virtual environment 52. At noted above, other equipment or components may be used to capture external perspective data, as indicated by reference numeral 54, and where provided these will also communicate with the processing system. Such devices may include, for example, range camera systems, time of flight imaging systems, and so forth. The virtual set systems and the shared virtual environment, as discussed in greater detail below, allow for placing the subject in the actual setting, in various virtual settings, in composite settings, and even allow for the replacement of the subject wholly or in part, such as by a simulated character. As noted, such views may be referred to as "virtual" or "synthetic".

The processing system 16 may then communicate with the subject of viewing components 24 to allow viewing of the subject video view by the subject, including during actual presence and movement of the subject in the actual setting. The set system 48 may be in communication with various downstream components, such as a monitor 56 on which different actual, virtual or composite views are displayed as indicated by reference numerals 58 and 60. As noted below, the downstream components may also include complex systems for storing, post-processing, broadcasting, distributing, and performing other functions based upon the actual setting view, a virtual setting view or any combination of these. It should be noted that where these views are "audience experienced", the external viewpoint may be driven by a technician (e.g., an on-set camera technician) or by the audience itself. That is, the paradigm for control of this view need not be limited to a one-way broadcast model, but may be audience-driven in many ways, beginning with manipulation of the external viewpoint.

Figure 2:
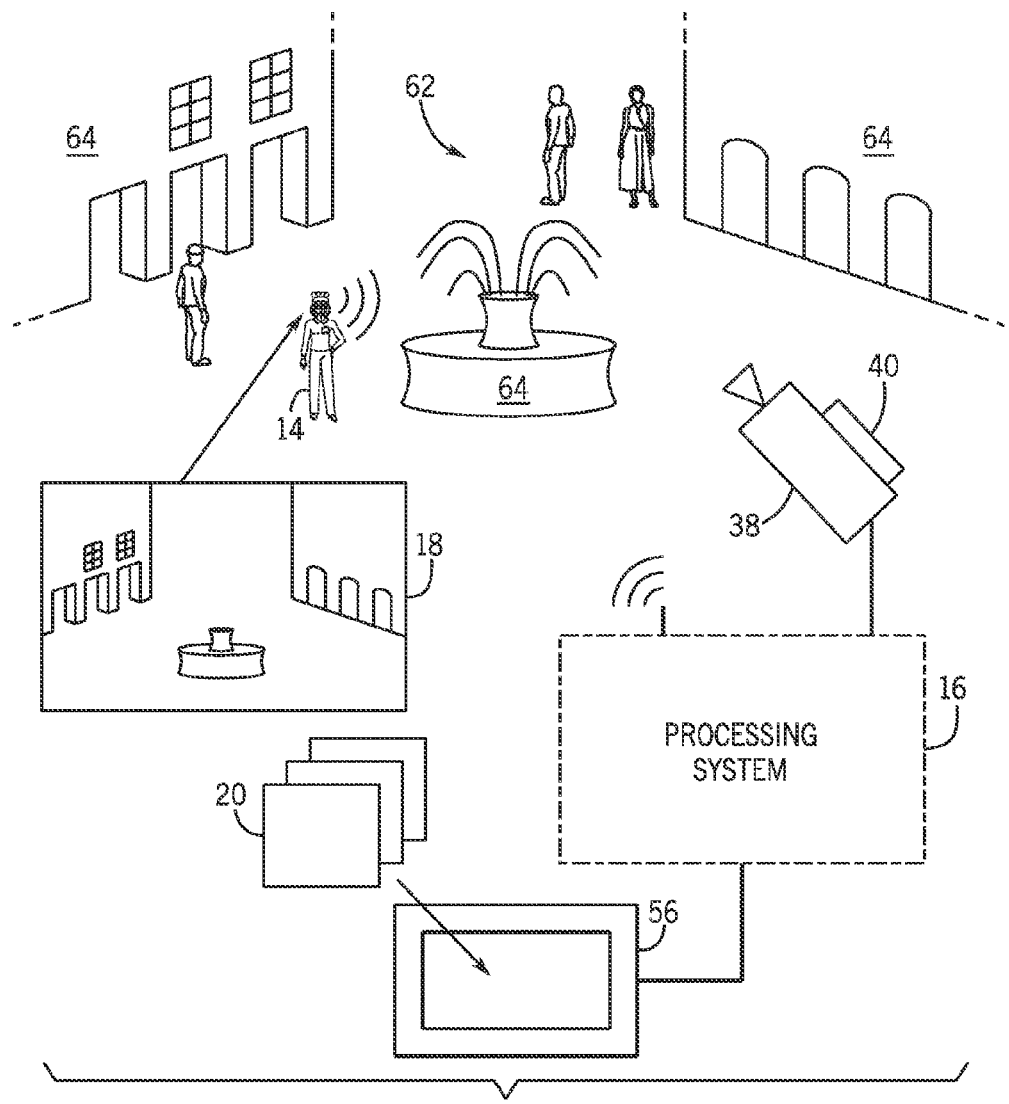
FIG. 2 is a diagrammatical illustration of a similar system in which a user is positioned in an actual setting.

As noted above, in certain applications, one or more subjects may be placed in an actual setting that includes features of the "real world". FIG. 2 illustrates an application of this type. Here, the subject 14 is placed in an actual street setting designated by reference numeral 62. The context of such settings may include buildings and architectural features, as indicated by reference numeral 64, or any desired objects. Where available, such objects may be used as fiducials for providing the appropriate orientation and stabilization of the subject perspective. Views 18 served to the subject for viewing may illustrate the actual setting as shown in FIG. 2, although completely different views may be served in which the objects are replaced by virtual objects, simulated objects, and so forth. Here again, the processing system 16 may create views 20 that show the subject in this actual setting, but may also create views that illustrate what the subject is viewing, or the subject in augmented reality views, completely virtual views, and so forth. As also noted above, the system is ideal for use in applications where image, position and/or other data are collected, and programming is developed for distribution to a potential audience. It may be found that, in many respects, position is best tracked through "outside looking in" viewpoints, and rotation through "inside looking out" viewpoints. Thus, for example, cameras on the subject and for the external viewpoint may track one another (adding accuracy) in addition to observing fiducials and/or mapped, highly trackable (e.g., high contrast) features. The processing circuitry may be designed, then, to utilize those features and views that provide the best positional and rotational tracking, including one or both (or additional) viewpoint data.

Figure 3:
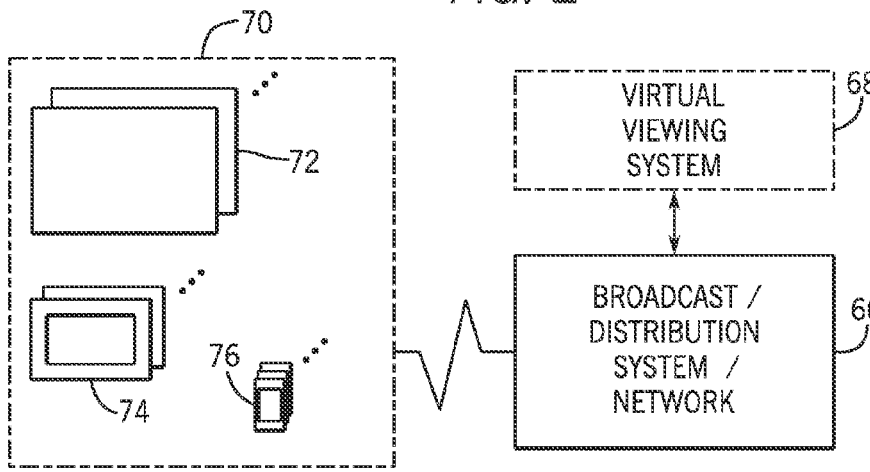
FIG. 3 is a diagrammatical representation for an overall system for capturing and distributing audience views utilizing systems such as those illustrated in FIGS. 1 and 2.

FIG. 3 illustrates certain functional components of this type of implementation. Here a broadcast/distribution system or network 66 allows for the storage and distribution of programs that may include one or more of the views captured or created by the system. The entire upstream system here is designated by reference numeral 68 as the virtual viewing system. Production or post-production manipulation of the images, integration of the images into a program with a format suitable for distribution may be performed here by the virtual viewing system or by the broadcast/distribution system or network. Commentary, advertising, and any suitable additional content may be incorporated with the output of the virtual viewing system for distribution. The distribution may be made by any suitable media. These may include, for example, broadcast television, satellite and cable television, motion picture distribution, Internet distribution, mobile and cellular network distribution, and so forth. The audience devices, collectively indicated by reference numeral 70 may include, by way of example, televisions 72, tablets or computer systems 74, mobile telephones, and similar portable devices 76, as well as any presently existing or future viewing, entertainment or other system. It should be noted that a very wide range of applications may exist for the virtual set system described herein, and the production, storage and distribution of the final content package may depend upon the particular application and the intended audience. For example, television and Internet-destined content may be packaged in one way, while content intended for training and advertising purposes may be packaged differently. Distribution networks will, of course, differ for these different types of content and applications. Moreover, certain applications will be more immediate in nature, such as in theme or amusement parks as described below. While these may be recorded, such as for advertising or souvenir purposes, the distribution in such applications may be entirely local for the surrounding audience with little or no capture for later storage and redistribution. It should be noted that the distribution approach is not limited to "single screen" scenarios, but multiple and "second screen" scenarios may be accommodated. Moreover, as noted below, the distribution approach may make use of audience interaction, particularly interaction that occurs during the activities of the subject, which may be considered "real time" or "near real time". This approach may provide "game like" feedback.

Figure 4:
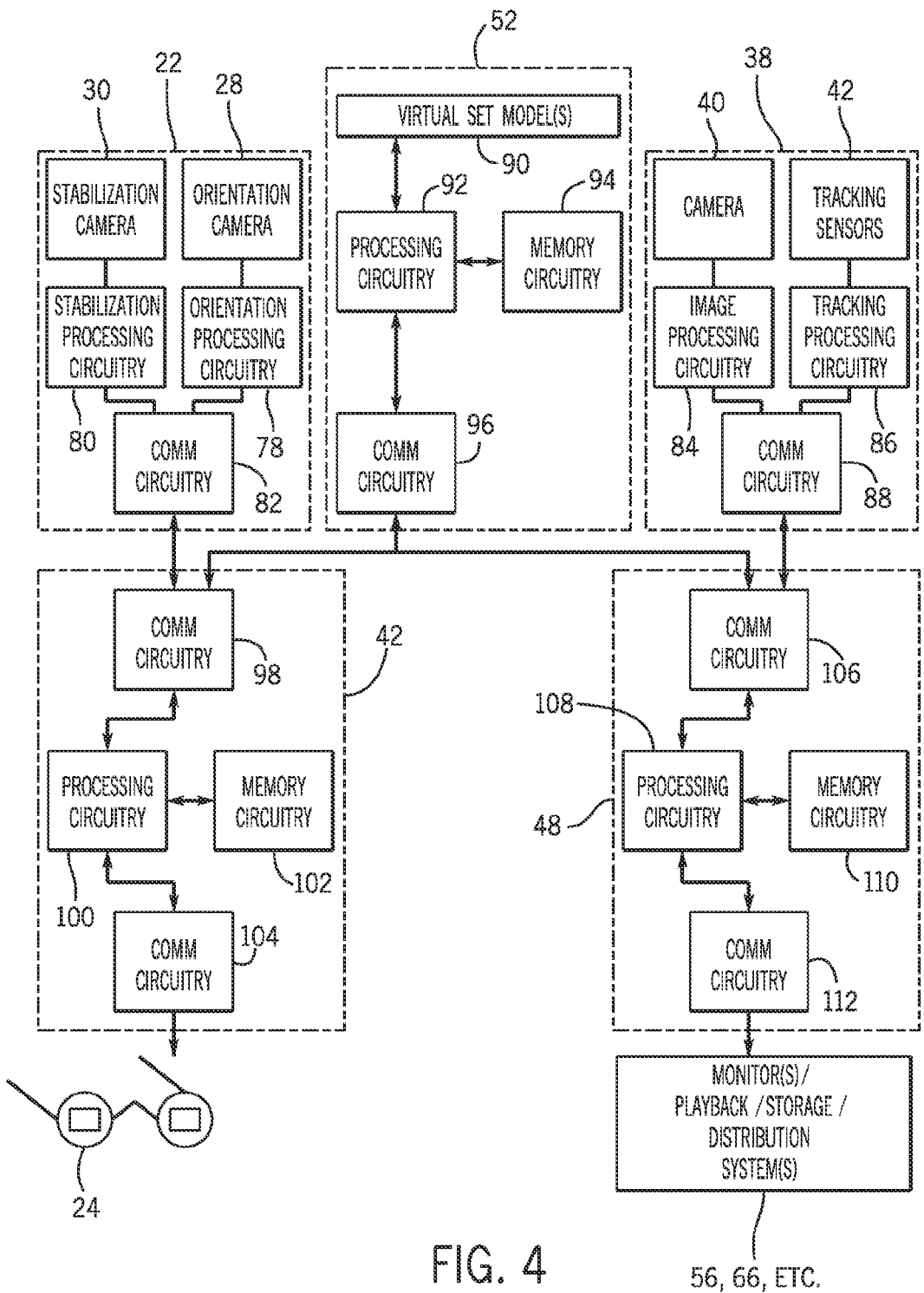
FIG. 4 is a more detailed diagrammatical representation of certain of the functional components that may be included in the virtual set system.

FIG. 4 illustrates certain functional components of the system described above. As noted, the system will typically include a subject imaging components 22 and external image data capture system components 38. The shared virtual environment 52 is another source of data, and all of these subsystems are coupled to the virtual set system 1, designated by reference numeral 42 and/or to the virtual set system 2, designated by reference numeral 48.

The subject imaging components 22, in the illustrated embodiment, include the orientation camera 28 and the stabilization camera 30. Each of these cameras coupled to respective processing circuitry as indicated by reference numerals 78 and 80. The processing circuitry will typically include one or more microprocessors and associated memory for storing image processing parameters, stabilization parameters, settings, image processing algorithms, stabilization algorithms, and so forth. In certain applications, the processing circuitry may be integrated so that two separate processing circuits are not needed. Some processing will typically take place in the subject imaging components, at least for adjustment of dynamic ranges, filtering of image and stabilization data, and so forth, and this processing may be based upon recognition of the fiducials described above. Communication circuitry 82 is then provided for communicating data to and receiving instructions and data from other system components, particularly the virtual set system 42. In presently contemplated embodiments, the orientation camera and stabilization camera may comprise for example, cameras available from Point Grey Research. Suitable firmware and software for processing the data collected by these devices may include products available from OpenCV and MAT-LAB.

Similarly, the external image data capture system 38 will typically include a camera 42 and one or more tracking sensors 42 that allow for determining the position and orientation of the camera. The camera 40 is associated with image processing circuitry 84 that at least partially processes the image data collected, again, adjustment of dynamic ranges, filtering of the images, and so forth. The tracking sensors are associated with tracking processing circuitry 86 that allows for the determining of the camera positioning and angle, the location of the camera, and so forth. As with the other processing circuitry, these components will typically include one or more microprocessors, associated memory, and any settings and algorithms stored within the memory for execution by the processors. Communications circuitry 88 is then provided for communicating image and tracking data as for receiving instructions and other data with other system components.

The shared virtual environment 52 will typically be based upon one or more virtual set models designated by reference numeral 90. These models may be based upon pre-recorded sets, artificially created sets and environments, modeled sets and environments, and so forth. Depending upon the implementation, multiple such models may be available so that the subject may be placed fully or partially in different situations and settings. One or more of these may be used with a particular set of data captured for the subject. The virtual set model is processed by processing circuitry 92 which is associated with memory circuitry 94 that will contain settings and algorithms for implementing the virtual set models, creating the perspectives desired based upon the models, and so forth. Communications circuitry 96 is provided for outputting the resulting data and for communicating instructions and other data back to the shared virtual environment. Moreover, as discussed above, "shared" tracking may be performed, allowing extension of the processing into generation of virtual set models in real or near real time from the tracking data itself. For example, sensors of the system may build models of the environment while the data capture is taking place (i.e., in real time).

In the illustrated implementation, the virtual set systems 42 and 48 may be generally symmetrical insomuch as they include respective communications circuitry 98 and 106, processing circuitry 100 and 108 with associated memory 102 and 110. Further communications circuitry 104 and 112 is provided for communicating the resulting video views to the subject viewing components 24 and to downstream components of the output of virtual set system 48, such as monitors, playback systems, storage systems, distribution systems, and so forth. In general, the processing circuitry of the virtual set system 42 will allow for a video view to be developed based upon the virtual set models and the data collected so that the video view will reflect for the subject a desired appearance of a virtual set in which the subject operates. Interestingly, this view will be from the point of view of the subject. On the other hand, the virtual set system 48 produces a view from the external perspective. This view also will typically be based upon the virtual set model and the data collected from the external viewpoint, and the view may utilize real or near real time building of the virtual environment (e.g., in a shared fashion) based on the tracking models of the environment. Although not separately represented in FIG. 4, it should be borne in mind that any of the views created or captures may be fed to the subject viewing components 24 and to the downstream components 56, 66 and so forth. Thus, programming based upon the views and data collected may show the subject in the actual environment, any one of the simulated environments, and these may be shown simultaneously or at desired times during the produced content. Those skilled in the art may recognize that certain classes of on-body viewing systems may be utilized, such as "look through" head-mounted displays, and "camera mediated" head-mounted displays. These may or may not present the subjects extremities (e.g., hands, arms, feet, legs) as they interact with the environment.

Figure 5:
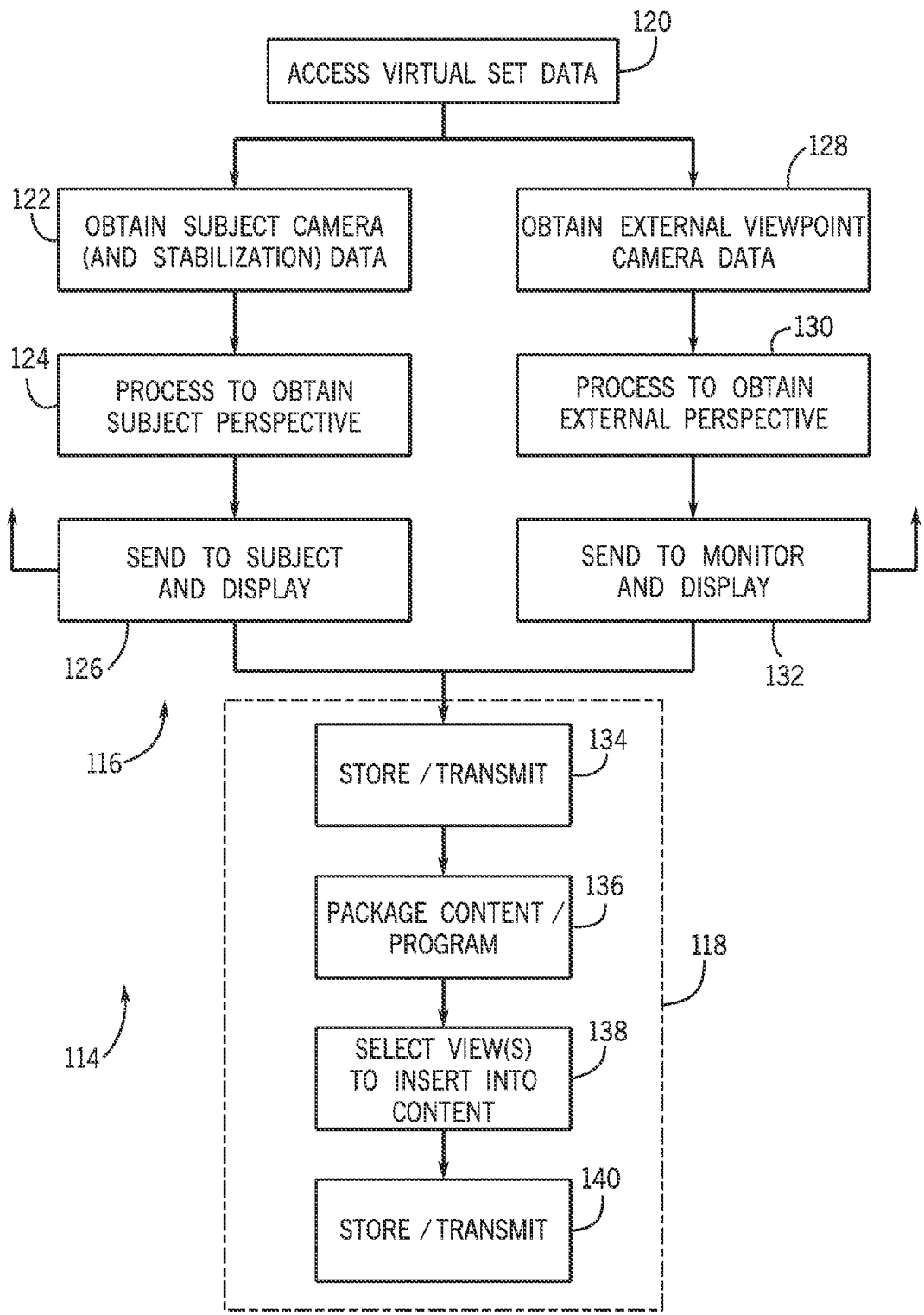
FIG. 5 is a flow chart illustrating certain logical steps that may be implemented in the use of the system.

FIG. 5 illustrates exemplary logic for utilization of the system described above. The logic, designated generally by reference numeral 114, may comprise several different phases. In the illustrated embodiment, these include a capture and creation phase 116 and a post-capture distribution phase 118. As noted, however, there can be many different applications for the system, and a particular phases of data capture, processing, distribution and use, post-processing (if any) and incorporation into other content for distribution will typically follow the particular application and use envisaged.

In general, the use case illustrated begins with access to the virtual set data as indicated by reference numeral 120. As noted, this will typically occur by accessing pre-recorded or simulated models for the virtual set. At step 122, subject camera (and where desired stabilization) data is obtained. As noted, although references is may adhere to "camera" data, the data may actually be gathered from devices other than cameras, such as various headgear, bodysuits, gloves, and so forth. At step 122 the capture data is processed to obtain a subject perspective. This subject perspective will take the form of one or more images, typically video views that are derived from both the virtual set data and the position, orientation and movement of the subject. These will be sent to the subject for display as indicated by reference numeral 126. In most cases this will be done in "real time" such that the subject may act and interact within and with the virtual environment or set. However, it should be understood that some delays are inevitable in the processing and presentation, and that certain delays may actually be desired. In most cases, it will be desired to present a subject viewpoint video view to the subject sufficiently close in time to the capture of subject viewpoint data to permit the subject to react to the view. For example, where a virtual or synthetic "world" is presented to the subject, the subject can experience the environment and react to it. Similarly, if some or all of the subject is replaced in the virtual or synthetic video view, such as with a synthesized character, the subject will experience himself or herself as the character.

In parallel, external view point camera data is obtained as indicated at step 128. Here again, while references are made to "camera data", the external view point may be captured by other means, such as range cameras, time of flight systems, and so forth. The capture data is then processed to obtain the external perspective as indicated at step 130. Here again, similar to the perspective obtained at step 124, the external perspective will allow for viewing the subject from the external point of view, either in the actual setting, in any one of the available virtual settings, in a pre-recorded setting, and so forth. The perspective will typically include one or more images, and more typically will be a video view which is fed back to the system or saved for later use. Where fed back to the system, any one of the images created may be displayed for system operators, production personnel, on-site or remote audiences, and so forth. Further, as discussed above, where desired the manipulation of the external viewpoint may be done by a technician (e.g., a camera technician) that may be "on-set", or by others, such as the audience or a subset of the audience viewing the resulting views.

FIG. 5 illustrates certain steps that may be performed in a subsequent phase. These may include, for example, storage and transmission of any one of the images captured or created as indicated at step 134. For example, live demonstrations, broadcasts, games, amusements, training sessions, and so forth may be transmitted as they are occurring. In addition, these may be packaged to create content and programming as indicated at step 136. Such packaging of the content may be done in accordance with any of the wide range of available technologies, such as for television consumption, Internet consumption, and the like. At step 138 certain views may be selected for inclusion in such content, and these will be packaged, typically, with commentary, interviews, explanations, and so forth. Certain of these may also include advertisement, user-specific specialty content, and so forth. Once completed in these post-creation steps, the resulting content may be stored for a later transmission as indicated at step 140. It should be noted that these steps are not limited to a "passive broadcast media" approach, but may employ various local real and near real time approaches, online distribution, interactive audience interactive implementations, and so forth.

Figure 6:
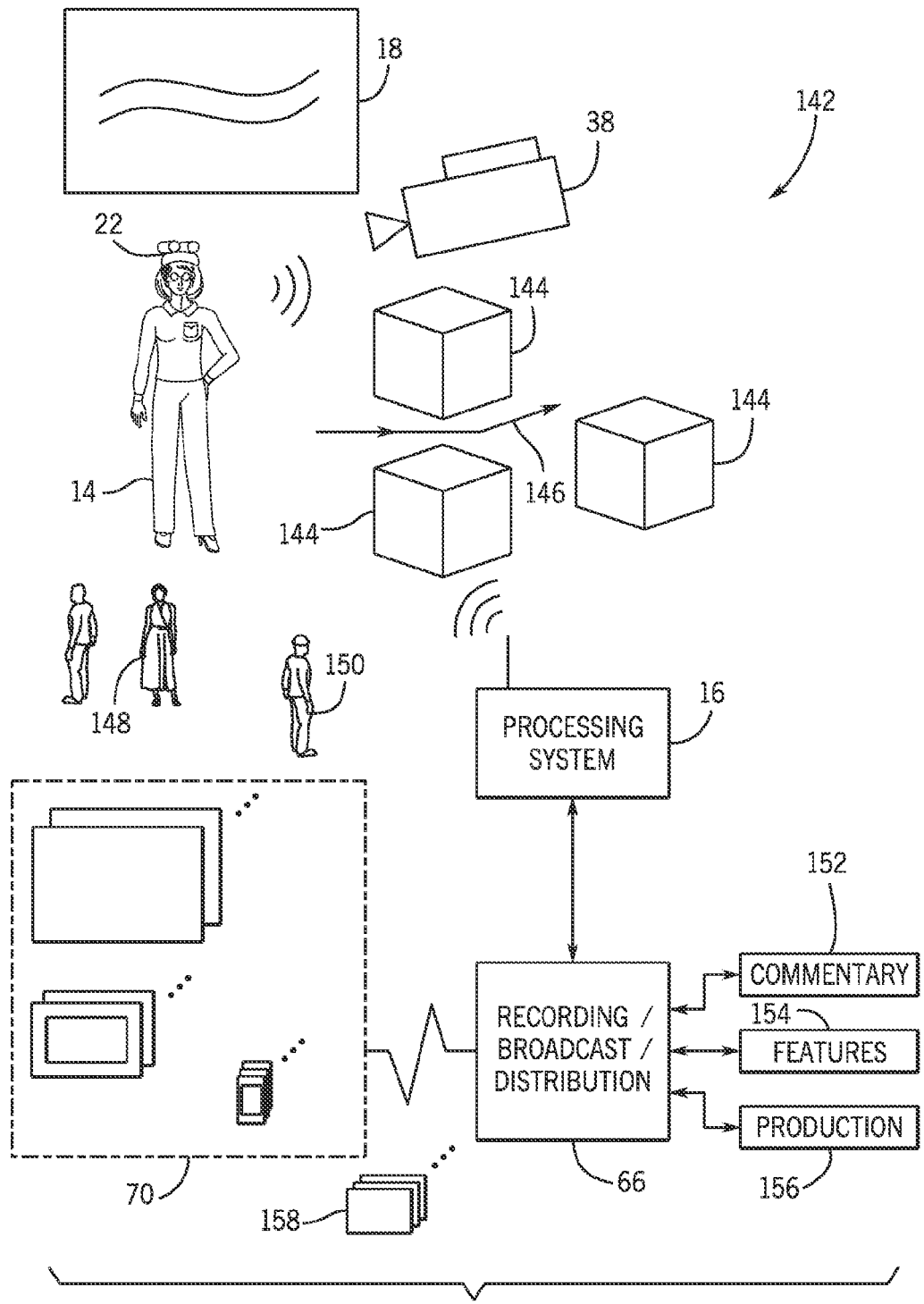
FIG. 6 is a diagrammatical representation for a particular implementation of the system used in connection with a game show or similar entertainment application.

FIGS. 6-9 illustrate certain exemplary implementations and applications of the foregoing system. For example, FIG. 6 illustrates an implementation for a game show that may be broadcast in real or near-real time or stored for later distribution. The game show implementation designated generally by reference numeral 142 is based upon all of the system components described above. In this case, by way of example only, the subject 14 is to navigate through obstacles 144, such as by taking a path 146. However, a virtual representation of the subject may be made in a virtual setting for the show purposes. A view served to the user may appear as a path, as indicated by reference numeral 18 or any desired virtual view may be served based upon the subject's position and orientation. The subject 14 may be one of multiple participants or contestants, depending upon the design and nature of the program. The contestants 48 may be present on the same set or may be sequestered, again depending upon the strategy of the program. One or more commentators or hosts 150 may be on hand to interact with the participants. A great variety of scenarios may be envisioned, such as paths and challenges that are at least partially dynamically determined, such as by audience participation. The processing system 16 will create this view as well as other views that may be informational or entertainment value. These may include, for example, a real time overhead map view illustrating the contestant progress. These will be incorporated either in the processing system 16 or in a recording or broadcast or distribution 66. In a case of a real or near-real time broadcast, these will typically be augmented by commentary as indicated by reference 152 and well as certain features 154. The commentary 152 will typically be provided by one or more personalities, such as host 150, whereas the features may include the various views created, slow motion views, replays, promotional content, and so forth. Production input 156 may also be provided, such as to package the content as desired by the creators and producers. The resulting content distributed, indicated by reference numeral 158, may include various formats for the various devices on which the content maybe viewed. These include not only different formats for television, but formats for Internet broadcast, broadcast to various hand-held devices, and so forth.

Figure 7:
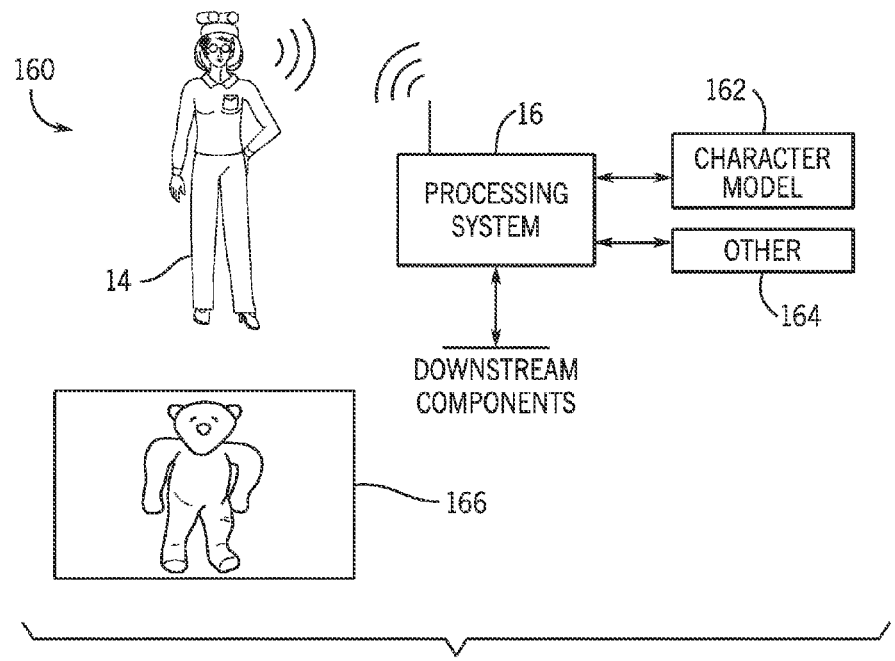
FIG. 7 is a diagrammatical representation of a particular implementation in which a full body (or partial) character replacement is performed by the system.

In FIG. 7 the system is used to partially or fully replace the subject with a surrogate character. The character replacement application 160 again includes all of the components described above. Here, the subject may be served with a view that allows them to participate and interact with the virtual environment from the subject's perspective. The processing system 16 may implement character models 162 as well as other input 164, such as movement or speech algorithms or any other desired inputs to create views in which the subject is partially or fully replaced by a character appearance. The resulting view 166 may be served to downstream components, such as for viewing, storage, and use in post-production. The application of FIG. 7 may be used, for example, for entertainment applications, feature film creation, and so forth.

Figure 8:
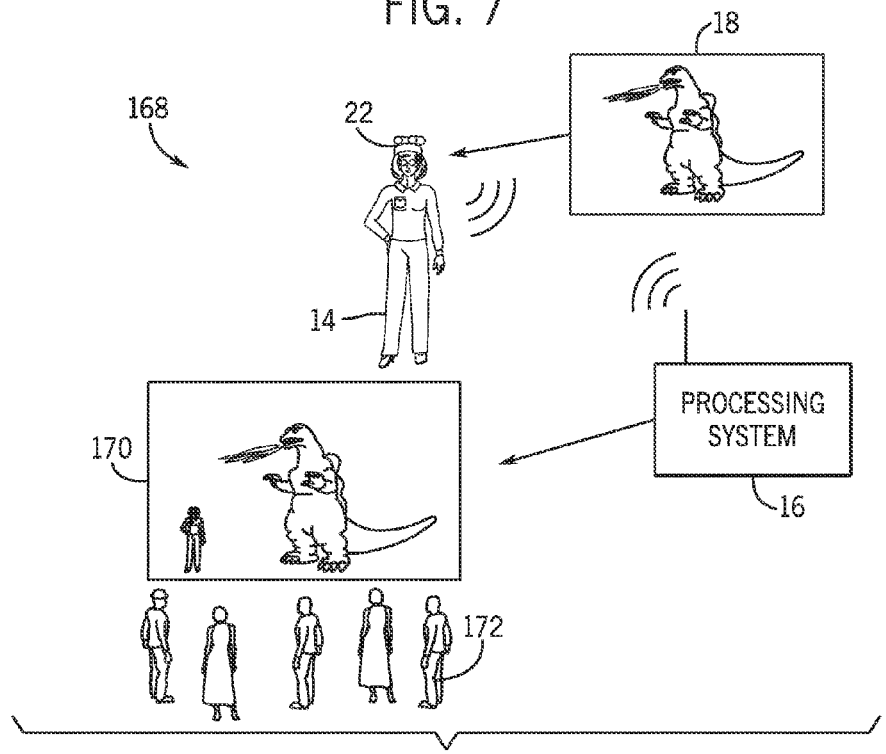
FIG. 8 is a diagrammatical representation of a further entertainment application of the system, in this case one that might be used in a theme or amusement park.

The application illustrated in FIG. 8 may be employed, for example, in a theme or amusement park. In this amusement application 168, the subject 14 is again served with views that allow them to interact with the virtual environment. The subject in the illustrated embodiment is served a view of a monster that may move and approach the subject, depending upon the experience desired. The processing system 16 serves this view as well as creates other views that may be entertaining to an audience. By way of example, in a theme park the subject may interact with certain characters and views of the subject interacting with the characters may be projected on a display 170 for viewing by an audience 172. Many different scenarios may be envisaged for real or near-real time audience viewing of this type. As noted above, for theme and amusement parks, resulting videos may be captured and stored that allow the subject to keep the resulting content as a souvenir.

Figure 9:
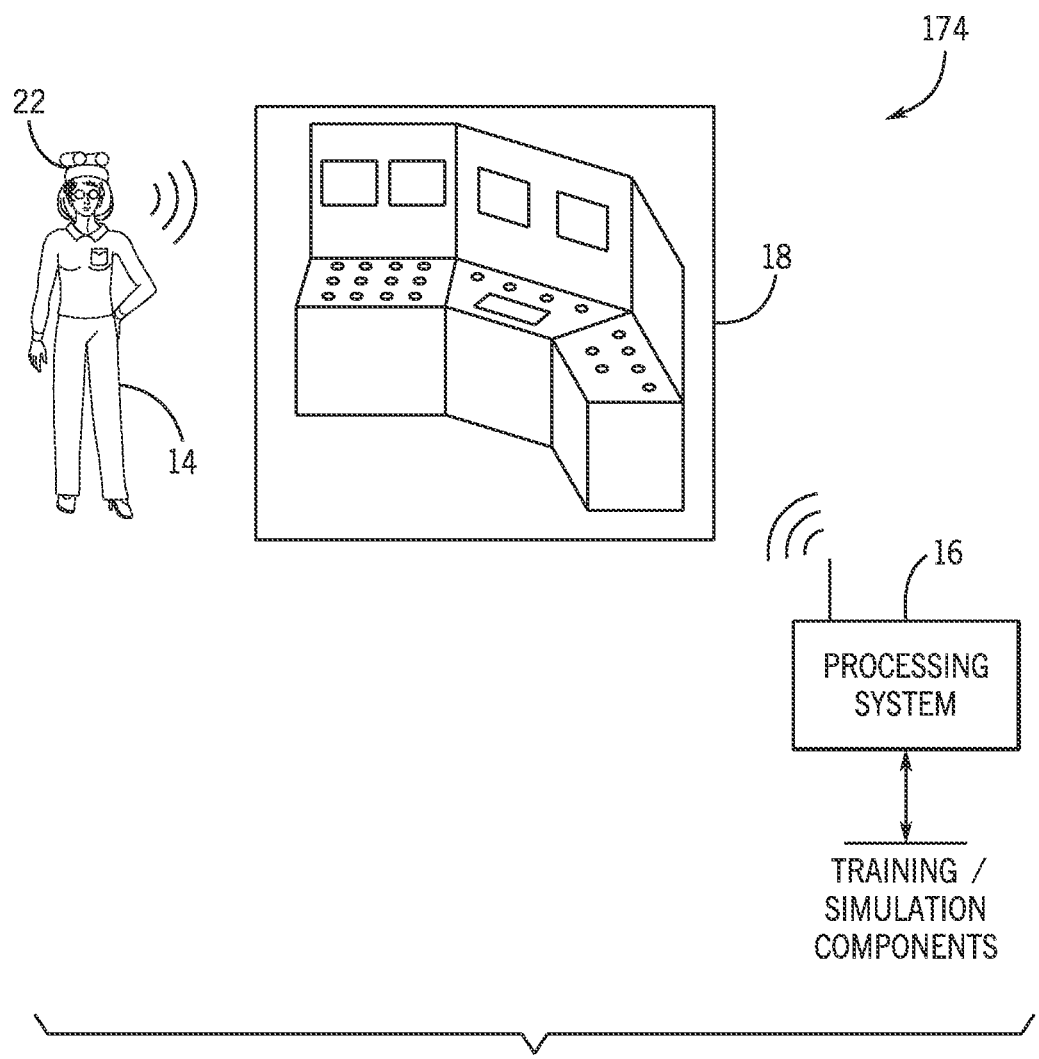
FIG. 9 is a diagrammatical representation of a further application of the system in a training or demonstration setting.

Finally, FIG. 9 illustrates an exemplary application 174 designed for training or simulation purposes. In this case, the subject 14 is presented with a view of a control room with equipment on which the subject is to be trained. A view of the subject in the environment may be served to training specialist so that they appreciate the progress of the training, instruct the subject as to how to interact with the environment, observe and improve the protected environment, and so forth. Here again, many applications may be envisage for such scenarios, including not simply the training of the subject but the adaptation of environments to facilitate user interaction. Demonstrations may also be made in this type of scenario allowing for equipment to experience prior to sale or ordering.

While only certain features of the invention have been illustrated and described herein, many modifications and changes will occur to those skilled in the art. It is, therefore, to be understood that the appended claims are intended to cover all such modifications and changes as fall within the true spirit of the invention.

For example, it may be possible and advantageous to combine certain of the functions described above, such as the capture of subject viewpoint data and external viewpoint data. By way of example only, if a camera or cameras, or other detectors can capture both the subject position and movement from the external viewpoint as well as the subject gaze direction, the functionality of these two portions of the overall system may be combined. Nothing in the present disclosure is intended to limit such combination in any way. Similarly, in some systems, both the subject viewpoint video view and the external viewpoint video view may be presented on a single or multiple viewers, such as a television screen or monitor. This "experience" will be different from those in which the viewer is worn by the subject, but may nevertheless provide feedback to the subject to allow the subject to accurately interact with the synthetic environment presented.

It is also contemplated that systems and methods employing the disclosed techniques may make use of audience interaction to enhance the experience (and entertainment value) for both the subject and others, particularly an audience. For example, the tracking system, depending upon high-contrast features in the environment (e.g., fiducial marks, but not necessarily limited to such marks) may best be "shared" by the subject and observer tracking systems. Further, each system may tend to compliment the other as regards "outside in" and "inside out" tracking to improve accuracy. Such approaches may make use of the fact that in many or most cases the observer camera or other device will typically be directed to the subject. Further, because the systems will build a model of the surrounding environment relevant for tracking, it should also be possible to use that environment as part of the viewing system, and to manipulate (e.g., change through effects) the view of the "real world".

The invention claimed is:

1. A system comprising:
 a subject-perspective camera configured to be worn by a subject to capture subject-perspective video image data indicating a view observed by the subject in an actual environment;
 a subject-capture camera configured to capture subject-capture video image data of the subject in the actual environment; and
 a processing system configured to:
  receive the subject-perspective video image data and the subject-capture video image data;
  obtain one or more fiducial references captured via the subject-perspective camera in the subject-perspective video image data, the subject-capture camera in the subject-capture video image data, or both, the one or more fiducial references comprising high contrast features that are separate from the subject;
  generate a perspective video view comprising a perspective of the subject in a virtual setting based upon the view observed by the subject in the actual environment and the one or more fiducial references, wherein the one or more fiducial references are not represented in the virtual setting of the perspective video view;
  generate a subject-placement video view comprising the subject or a surrogate character representing the subject in the virtual setting, based on a position of the subject in the actual environment, as indicated in the subject-capture video image data and the one or more fiducial references, wherein the one or more fiducial references are not represented in the virtual setting of the subject-placement video view;
  present the perspective video view to the subject, via a viewer, sufficiently close in time to the capture of the subject-perspective video image data to permit the subject to react to the perspective video view; and
  present the subject-placement video view to a person other than the subject, to the subject, or to both.

2. The system of claim 1, wherein the subject-placement video view is presented to the person other than the subject, the subject, or both while the perspective video view is being presented to the subject.

3. The system of claim 1, comprising a subject viewable device configured to be worn by the subject and to receive and display the perspective video view for viewing by the subject.

4. The system of claim 1, wherein the subject-capture camera is configured to capture the one or more fiducial references for use by the processing system in generating the perspective video view.

5. The system of claim 1, comprising a stabilizing camera configured to be worn by the subject and to capture stabilizing image data, and wherein the processing system is configured to stabilize at least one of the video views based on the stabilizing image data.

6. The system of claim 5, wherein the stabilizing camera is configured to capture the one or more fiducial references for use by the processing system in stabilizing the perspective video view.

7. The system of claim 1, comprising a virtual setting model referenced by the processing system for generation of the video views.

8. The system of claim 1, wherein the processing system is configured to generate the perspective video view while the subject-perspective video image data is being captured.

9. The system of claim 8, wherein the processing system is configured to display the perspective video view for viewing by the subject as the subject-perspective video image data is being captured.

10. The system of claim 1, wherein the processing system is configured to generate the subject-placement video view while the subject-capture video image data is being captured.

11. The system of claim 1, comprising a video distribution component configured to distribute for viewing either the perspective video view or the subject-placement video view, or both.

12. The system of claim 1, wherein the processing system is configured to generate a third video view of the subject in an actual setting including the one or more fiducial references.

13. The system of claim 12, comprising a video distribution component configured to distribute for viewing either the perspective video view, the subject-placement video view, the third video view, or any combination thereof.

14. A system comprising:
 a subject-perspective sensing device configured to determine subject-perspective viewpoint data indicative of a subject point of view in an actual environment;
 a subject-capture data system configured to determine subject-capture viewpoint data indicative of position and movement of the subject in the actual environment from an external point of view; and
 a processing system configured to:
  receive the subject-perspective viewpoint data and the subject-capture viewpoint data;
  reference a virtual model;
  obtain one or more fiducial references captured via the subject-perspective sensing device, the subject-capture data system, or both, the one or more fiducial references comprising high contrast features that are separate from the subject;
  generate a perspective video view comprising a perspective of the subject in a virtual setting based upon the view observed by the subject in the actual environment and the one or more fiducials, wherein the one or more fiducial references are not represented in the perspective video view;
  generate a subject-placement video view comprising the subject or a surrogate character representing the subject in the virtual setting, based on a position of the subject in the actual environment, as indicated in the subject-capture viewpoint data and the one or more fiducial references, wherein the one or more fiducial references are not represented in the subject-placement video view;
  present the perspective video view to the subject via a viewer sufficiently close in time to the determination of the subject-perspective viewpoint data to permit the subject to react to the perspective video view; and
  present the subject-placement video view to a person other than the subject, to the subject, or to both.

15. The system of claim 13, wherein the subject-perspective sensing device comprises at least one camera configured to be worn by the subject.

16. The system of claim 13, wherein the viewer is configured to be worn by the subject.

17. The system of claim 13, wherein the subject-capture data system comprises a camera.

18. The system of claim 16, wherein the subject-capture data system comprises a sensor configured to determine orientation of the camera.

19. A method comprising:
   determining subject-perspective viewpoint data indicative of a subject point of view in an actual environment;
   determining subject-capture viewpoint data indicative of position and movement of the subject in the actual environment from an external point of view;
   obtaining one or more fiducial references, the one or more fiducial references comprising high contrast features that are separate from the subject;
   processing the subject-perspective viewpoint data, the subject-capture viewpoint data, the one or more fiducial references, and a virtual model to:
      generate a perspective video view comprising a perspective of the subject and/or at least partial replacement of the subject with a virtual character representation in a virtual setting based upon the view observed by the subject in the actual environment and the one or more fiducials, wherein the one or more fiducial references are not represented in the perspective video view; and
      generate a subject-placement video view comprising the subject or the virtual character representation in the virtual setting, based on a position of the subject in the actual environment, as indicated in the subject-capture video image data and the one or more fiducial references, wherein the one or more fiducial references are not represented in the subject-placement video view; and
   presenting the perspective video view to the subject via a viewer sufficiently close in time to the determination of the subject-perspective viewpoint data to permit the subject to react to the perspective video view; and
   presenting the subject-placement video view to a person other than the subject, to the subject, or to both.

20. The method of claim 19, comprising presenting the subject-placement video view to the person other than the subject substantially simultaneously with presentation of the perspective video view to the subject.

21. The system of claim 1, wherein the perspective video view is presented to the person other than the subject while the perspective video view is being presented to the subject.

22. The system of claim 1, wherein the subject-perspective video image data comprises an inside looking out viewpoint;
   wherein the external video image data comprises an outside looking in viewpoint; and
   wherein the processing system is configured to:
      track a rotation of the subject using the inside looking out viewpoint;
      track a position of the subject using the outside looking in viewpoint; and
      use the rotation of the subject, the position of the subject, or both, to improve accuracy of the perspective video view, the subject-placement video view, or both.

23. The system of claim 1, wherein the subject-capture camera is controlled by a third party other than the subject to change a viewpoint of the subject or the surrogate character in the virtual setting in the subject-placement video view.

24. The system of claim 1, wherein the subject-placement video view comprises the surrogate character generated using a character model.

* * * * *